United States Patent
Patel et al.

(10) Patent No.: US 11,475,416 B1
(45) Date of Patent: *Oct. 18, 2022

(54) SYSTEM AND METHOD FOR AUDITING THE FILL STATUS OF A CUSTOMER WASTE CONTAINER BY A WASTE SERVICES PROVIDER DURING PERFORMANCE OF A WASTE SERVICE ACTIVITY

(71) Applicant: WM INTELLECTUAL PROPERTY HOLDINGS, LLC, Houston, TX (US)

(72) Inventors: Kalpesh Patel, Houston, TX (US);
Barry Skolnick, Reno, NV (US);
Shivkumar Vithal, Houston, TX (US);
Pamela C. Jansen, Houston, TX (US)

(73) Assignee: WM INTELLECTUAL PROPERTY HOLDINGS LLC, Houston, TX (US)

( * ) Notice: Subject to any disclaimer, the term of this patent is extended or adjusted under 35 U.S.C. 154(b) by 653 days.

This patent is subject to a terminal disclaimer.

(21) Appl. No.: 16/549,531

(22) Filed: Aug. 23, 2019

(51) Int. Cl.
| | | |
|---|---|---|
| *H04N 7/18* | (2006.01) | |
| *B65F 3/00* | (2006.01) | |
| *G06Q 10/00* | (2012.01) | |
| *B65F 3/02* | (2006.01) | |
| *G06Q 20/14* | (2012.01) | |
| *G06V 20/20* | (2022.01) | |

(52) U.S. Cl.
CPC ............... *G06Q 10/30* (2013.01); *B65F 3/02* (2013.01); *G06Q 20/145* (2013.01); *G06V 20/20* (2022.01)

(58) Field of Classification Search
CPC ........ G06Q 10/30; G06Q 20/145; B65F 3/02; G06V 20/20
See application file for complete search history.

(56) References Cited

U.S. PATENT DOCUMENTS

| | | |
|---|---|---|
| 3,202,305 A | 8/1965 | Herpich |
| 5,072,833 A | 12/1991 | Hansen et al. |
| 5,230,393 A | 7/1993 | Mezey |
| 5,245,137 A | 9/1993 | Bowman et al. |
| 5,278,914 A | 1/1994 | Kinoshita et al. |
| 5,489,898 A | 2/1996 | Shigekusa et al. |
| 5,762,461 A | 6/1998 | Frohlingsdorf |
| 5,837,945 A | 11/1998 | Cornwell et al. |

(Continued)

FOREIGN PATENT DOCUMENTS

| | | |
|---|---|---|
| CA | 2632738 | 5/2016 |
| CA | 2632689 | 10/2016 |

(Continued)

OTHER PUBLICATIONS

US 9,092,921 B2, 07/2015, Lambert et al. (withdrawn)

(Continued)

*Primary Examiner* — Talia F Crawley
(74) *Attorney, Agent, or Firm* — Greenberg Traurig LLP

(57) ABSTRACT

Systems and methods are provided for using video/still images captured by continuously recording optical sensors mounted on waste collection vehicles used in in the waste collection, disposal and recycling industry for operational and customer service related purposes. A system is provided for auditing the fill status of a customer waste container by a waste services provider during performance of a waste service activity.

26 Claims, 10 Drawing Sheets

(56) References Cited

U.S. PATENT DOCUMENTS

| | | |
|---|---|---|
| 6,097,995 A | 8/2000 | Tipton et al. |
| 6,408,261 B1 | 6/2002 | Durbin |
| 6,448,898 B1 | 9/2002 | Kasik |
| 6,510,376 B2 | 1/2003 | Burnstein et al. |
| 6,563,433 B2 | 5/2003 | Fujiwara |
| 6,729,540 B2 | 5/2004 | Ogawa |
| 6,811,030 B1 | 11/2004 | Compton et al. |
| 7,146,294 B1 | 12/2006 | Waitkus, Jr. |
| 7,330,128 B1 | 2/2008 | Lombardo et al. |
| 7,383,195 B2 | 6/2008 | Mallett et al. |
| 7,406,402 B1 | 7/2008 | Waitkus, Jr. |
| 7,501,951 B2 | 3/2009 | Maruca et al. |
| 7,511,611 B2 | 3/2009 | Sabino et al. |
| 7,536,457 B2 | 5/2009 | Miller |
| 7,659,827 B2 | 2/2010 | Gunderson et al. |
| 7,804,426 B2 | 9/2010 | Etcheson |
| 7,817,021 B2 | 10/2010 | Date et al. |
| 7,870,042 B2 | 1/2011 | Maruca et al. |
| 7,878,392 B2 | 2/2011 | Mayers et al. |
| 7,957,937 B2 | 6/2011 | Waitkus, Jr. |
| 7,994,909 B2 | 8/2011 | Maruca et al. |
| 7,999,688 B2 | 8/2011 | Healey et al. |
| 8,020,767 B2 | 9/2011 | Reeves et al. |
| 8,056,817 B2 | 11/2011 | Flood |
| 8,146,798 B2 | 4/2012 | Flood et al. |
| 8,185,277 B2 | 5/2012 | Flood et al. |
| 8,269,617 B2 | 9/2012 | Cook et al. |
| 8,314,708 B2 | 11/2012 | Gunderson et al. |
| 8,330,059 B2 | 12/2012 | Curotto |
| 8,332,247 B1 | 12/2012 | Bailey et al. |
| 8,373,567 B2 | 2/2013 | Denson |
| 8,374,746 B2 | 2/2013 | Plante |
| 8,384,540 B2 | 2/2013 | Reyes et al. |
| 8,485,301 B2 | 7/2013 | Grubaugh et al. |
| 8,508,353 B2 | 8/2013 | Cook et al. |
| 8,542,121 B2 | 9/2013 | Maruca et al. |
| 8,550,252 B2 | 10/2013 | Borowski et al. |
| 8,564,426 B2 | 10/2013 | Cook et al. |
| 8,564,446 B2 | 10/2013 | Gunderson et al. |
| 8,602,298 B2 | 12/2013 | Gonen |
| 8,606,492 B1 | 12/2013 | Botnen |
| 8,630,773 B2 | 1/2014 | Lee et al. |
| 8,645,189 B2 | 2/2014 | Lyle |
| 8,674,243 B2 | 3/2014 | Curotto |
| 8,676,428 B2 | 3/2014 | Richardson et al. |
| 8,714,440 B2 | 5/2014 | Flood et al. |
| 8,738,423 B2 | 5/2014 | Lyle |
| 8,744,642 B2 | 6/2014 | Nemat-Nasser et al. |
| 8,803,695 B2 | 8/2014 | Denson |
| 8,818,908 B2 | 8/2014 | Altice et al. |
| 8,849,501 B2 | 9/2014 | Cook et al. |
| 8,854,199 B2 | 10/2014 | Cook et al. |
| 8,862,495 B2 | 10/2014 | Ritter |
| 8,880,279 B2 | 11/2014 | Plante |
| 8,930,072 B1 | 1/2015 | Lambert et al. |
| 8,952,819 B2 | 2/2015 | Nemat-Nasser |
| 8,970,703 B1 | 3/2015 | Thomas, II et al. |
| 8,996,234 B1 | 3/2015 | Tamari et al. |
| 9,047,721 B1 | 6/2015 | Botnen |
| 9,058,706 B2 | 6/2015 | Cheng |
| 9,098,884 B2 | 8/2015 | Borowski et al. |
| 9,098,956 B2 | 8/2015 | Lambert et al. |
| 9,111,453 B1 | 8/2015 | Alselimi |
| 9,158,962 B2 | 10/2015 | Nemat-Nasser et al. |
| 9,180,887 B2 | 11/2015 | Nemat-Nasser et al. |
| 9,189,899 B2 | 11/2015 | Cook et al. |
| 9,226,004 B1 | 12/2015 | Plante |
| 9,235,750 B1 | 1/2016 | Sutton et al. |
| 9,238,467 B1 | 1/2016 | Hoye et al. |
| 9,240,079 B2 | 1/2016 | Lambert et al. |
| 9,240,080 B2 | 1/2016 | Lambert et al. |
| 9,245,391 B2 | 1/2016 | Cook et al. |
| 9,247,040 B1 | 1/2016 | Sutton |
| 9,251,388 B2 | 2/2016 | Flood |
| 9,268,741 B1 | 2/2016 | Lambert et al. |
| 9,275,090 B2 | 3/2016 | Denson |
| 9,280,857 B2 | 3/2016 | Lambert et al. |
| 9,292,980 B2 | 3/2016 | Cook et al. |
| 9,298,575 B2 | 3/2016 | Tamari et al. |
| 9,317,980 B2 | 4/2016 | Cook et al. |
| 9,330,287 B2 | 5/2016 | Graczyk et al. |
| 9,341,487 B2 | 5/2016 | Bonhomme |
| 9,342,884 B2 | 5/2016 | Mask |
| 9,344,683 B1 | 5/2016 | Nemat-Nasser et al. |
| 9,347,818 B2 | 5/2016 | Curotto |
| 9,358,926 B2 | 6/2016 | Lambert et al. |
| 9,373,257 B2 | 6/2016 | Bonhomme |
| 9,389,147 B1 | 7/2016 | Lambert et al. |
| 9,390,568 B2 | 7/2016 | Nemat-Nasser et al. |
| 9,396,453 B2 | 7/2016 | Hynes et al. |
| 9,401,985 B2 | 7/2016 | Sutton |
| 9,403,278 B1 | 8/2016 | Van Kampen et al. |
| 9,405,992 B2 | 8/2016 | Badholm et al. |
| 9,418,488 B1 | 8/2016 | Lambert |
| 9,428,195 B1 | 8/2016 | Surpi |
| 9,442,194 B2 | 9/2016 | Kurihara et al. |
| 9,463,110 B2 | 10/2016 | Nishtala et al. |
| 9,466,212 B1 | 10/2016 | Stumphauzer, II et al. |
| 9,472,083 B2 | 10/2016 | Nemat-Nasser |
| 9,495,811 B2 | 11/2016 | Herron |
| 9,501,690 B2 | 11/2016 | Nemat-Nasser et al. |
| 9,520,046 B2 | 12/2016 | Call et al. |
| 9,525,967 B2 | 12/2016 | Mamlyuk |
| 9,546,040 B2 | 1/2017 | Flood et al. |
| 9,573,601 B2 | 2/2017 | Hoye et al. |
| 9,574,892 B2 | 2/2017 | Rodoni |
| 9,586,756 B2 | 3/2017 | O'Riordan et al. |
| 9,589,393 B2 | 3/2017 | Botnen |
| 9,594,725 B1 | 3/2017 | Cook et al. |
| 9,595,191 B1 | 3/2017 | Surpi |
| 9,597,997 B2 | 3/2017 | Mitsuta et al. |
| 9,604,648 B2 | 3/2017 | Tamari et al. |
| 9,633,318 B2 | 4/2017 | Plante |
| 9,633,576 B2 | 4/2017 | Reed |
| 9,639,535 B1 | 5/2017 | Ripley |
| 9,646,651 B1 | 5/2017 | Richardson |
| 9,650,051 B2 | 5/2017 | Hoye et al. |
| 9,679,210 B2 | 6/2017 | Sutton et al. |
| 9,685,098 B1 | 6/2017 | Kypri |
| 9,688,282 B2 | 6/2017 | Cook |
| 9,702,113 B2 | 7/2017 | Kotaki et al. |
| 9,707,595 B2 | 7/2017 | Ripley |
| 9,721,342 B2 | 8/2017 | Mask |
| 9,734,717 B1 | 8/2017 | Surpi et al. |
| 9,754,382 B1 | 9/2017 | Rodoni |
| 9,766,086 B1 | 9/2017 | Rodoni |
| 9,778,058 B2 | 10/2017 | Rodoni |
| 9,803,994 B1 | 10/2017 | Rodoni |
| 9,824,336 B2 | 11/2017 | Borges et al. |
| 9,824,337 B1 | 11/2017 | Rodoni |
| 9,834,375 B2 | 12/2017 | Jenkins et al. |
| 9,852,405 B1 | 12/2017 | Rodoni et al. |
| 10,029,685 B1 | 7/2018 | Hubbard et al. |
| 10,152,737 B2 | 12/2018 | Lyman |
| 10,198,718 B2 | 2/2019 | Rodoni |
| 10,210,623 B2 | 2/2019 | Rodoni |
| 10,255,577 B1 | 4/2019 | Steves et al. |
| 10,311,501 B1 | 6/2019 | Rodoni |
| 10,332,197 B2 | 6/2019 | Kekalainen et al. |
| 10,354,232 B2 | 7/2019 | Tomlin, Jr. et al. |
| 10,382,915 B2 | 8/2019 | Rodoni |
| 10,410,183 B2 | 9/2019 | Bostick et al. |
| 10,594,991 B1 * | 3/2020 | Skolnick ................ H04N 7/188 |
| 10,750,134 B1 * | 8/2020 | Skolnick ................ H04N 7/188 |
| 10,855,958 B1 | 12/2020 | Skolnick |
| 10,911,726 B1 | 2/2021 | Skolnick |
| 11,074,557 B2 * | 7/2021 | Flood ........................ B65F 3/00 |
| 11,128,841 B1 | 9/2021 | Skolnick |
| 11,140,367 B1 | 10/2021 | Skolnick |
| 11,172,171 B1 | 11/2021 | Skolnick |
| 11,373,536 B1 | 6/2022 | Savchenko |
| 11,386,362 B1 | 7/2022 | Kim |
| 11,425,340 B2 | 8/2022 | Skolnick |
| 2002/0069097 A1 | 6/2002 | Conrath |

(56) References Cited

U.S. PATENT DOCUMENTS

| | | |
|---|---|---|
| 2002/0077875 A1 | 6/2002 | Nadir |
| 2002/0125315 A1 | 9/2002 | Ogawa |
| 2002/0194144 A1 | 12/2002 | Berry |
| 2003/0014334 A1 | 1/2003 | Tsukamoto |
| 2003/0031543 A1 | 2/2003 | Elbrink |
| 2003/0069745 A1 | 4/2003 | Zenko |
| 2003/0191658 A1 | 10/2003 | Rajewski |
| 2003/0233261 A1 | 12/2003 | Kawahara et al. |
| 2004/0039595 A1 | 2/2004 | Berry |
| 2004/0167799 A1 | 8/2004 | Berry |
| 2005/0038572 A1 | 2/2005 | Krupowicz |
| 2005/0080520 A1 | 4/2005 | Kline et al. |
| 2005/0182643 A1 | 8/2005 | Ian |
| 2005/0209825 A1 | 9/2005 | Ogawa |
| 2005/0261917 A1 | 11/2005 | Forget Shield |
| 2006/0235808 A1 | 10/2006 | Berry |
| 2007/0150138 A1 | 6/2007 | Plante |
| 2007/0260466 A1 | 11/2007 | Casella et al. |
| 2007/0278140 A1* | 12/2007 | Mallett ............. B07C 5/34 705/308 |
| 2008/0010197 A1 | 1/2008 | Scherer |
| 2008/0077541 A1 | 3/2008 | Scherer et al. |
| 2008/0202357 A1* | 8/2008 | Flood ............... G06F 16/9554 100/48 |
| 2008/0234889 A1 | 9/2008 | Sorensen |
| 2009/0014363 A1 | 1/2009 | Gonen et al. |
| 2009/0024479 A1 | 1/2009 | Gonen et al. |
| 2009/0055239 A1* | 2/2009 | Waitkus, Jr. ........ G06Q 10/08 702/156 |
| 2009/0083090 A1 | 3/2009 | Rolfes et al. |
| 2009/0126473 A1* | 5/2009 | Porat .................. G01F 23/00 340/815.4 |
| 2009/0138358 A1 | 5/2009 | Gonen et al. |
| 2009/0157255 A1 | 6/2009 | Plante |
| 2009/0161907 A1 | 6/2009 | Healey et al. |
| 2010/0017276 A1 | 1/2010 | Wolff et al. |
| 2010/0071572 A1* | 3/2010 | Carroll ............... B30B 9/3007 100/229 A |
| 2010/0119341 A1 | 5/2010 | Flood et al. |
| 2010/0175556 A1 | 7/2010 | Kummer et al. |
| 2010/0185506 A1 | 7/2010 | Wolff et al. |
| 2010/0217715 A1 | 8/2010 | Lipcon |
| 2010/0312601 A1 | 12/2010 | Lin |
| 2011/0108620 A1 | 5/2011 | Wadden et al. |
| 2011/0137776 A1 | 6/2011 | Goad et al. |
| 2011/0208429 A1 | 8/2011 | Zheng et al. |
| 2011/0225098 A1 | 9/2011 | Wolff et al. |
| 2011/0260878 A1* | 10/2011 | Rigling .............. G01G 19/52 340/665 |
| 2011/0279245 A1 | 11/2011 | Hynes et al. |
| 2011/0316689 A1 | 12/2011 | Reyes et al. |
| 2012/0029980 A1 | 2/2012 | Paz et al. |
| 2012/0029985 A1 | 2/2012 | Wilson et al. |
| 2012/0047080 A1 | 2/2012 | Rodatos |
| 2012/0262568 A1 | 10/2012 | Ruthenberg |
| 2012/0265589 A1 | 10/2012 | Whittier |
| 2012/0310691 A1 | 12/2012 | Carlsson et al. |
| 2013/0024335 A1 | 1/2013 | Lok |
| 2013/0039728 A1 | 2/2013 | Price et al. |
| 2013/0041832 A1 | 2/2013 | Rodatos |
| 2013/0075468 A1 | 3/2013 | Wadden et al. |
| 2013/0332238 A1 | 12/2013 | Lyle |
| 2013/0332247 A1 | 12/2013 | Gu |
| 2014/0060939 A1 | 3/2014 | Eppert |
| 2014/0112673 A1* | 4/2014 | Sayama ............. G03G 21/12 399/35 |
| 2014/0114868 A1 | 4/2014 | Wan et al. |
| 2014/0172174 A1 | 6/2014 | Poss et al. |
| 2014/0214697 A1 | 7/2014 | Mcsweeney |
| 2014/0236446 A1 | 8/2014 | Spence |
| 2014/0278630 A1 | 9/2014 | Gates et al. |
| 2014/0379588 A1* | 12/2014 | Gates ............... G06Q 10/0631 705/308 |
| 2015/0095103 A1 | 4/2015 | Rajamani et al. |
| 2015/0100428 A1 | 4/2015 | Parkinson, Jr. |
| 2015/0144012 A1 | 5/2015 | Frybarger |
| 2015/0278759 A1 | 10/2015 | Harris et al. |
| 2015/0294431 A1 | 10/2015 | Fiorucci et al. |
| 2015/0298903 A1 | 10/2015 | Luxford |
| 2015/0302364 A1 | 10/2015 | Calzada et al. |
| 2015/0307273 A1 | 10/2015 | Lyman |
| 2015/0324760 A1* | 11/2015 | Borowski ............. B65F 1/0006 705/308 |
| 2015/0326829 A1 | 11/2015 | Kurihara et al. |
| 2015/0348252 A1* | 12/2015 | Mask ................. G06T 7/001 382/103 |
| 2015/0350610 A1 | 12/2015 | Loh |
| 2016/0021287 A1 | 1/2016 | Loh |
| 2016/0044285 A1 | 2/2016 | Gasca et al. |
| 2016/0179065 A1 | 6/2016 | Shahabdeen |
| 2016/0187188 A1 | 6/2016 | Curotto |
| 2016/0224846 A1 | 8/2016 | Cardno |
| 2016/0232498 A1 | 8/2016 | Tomlin, Jr. et al. |
| 2016/0239689 A1 | 8/2016 | Flood |
| 2016/0247058 A1 | 8/2016 | Kreiner et al. |
| 2016/0292653 A1 | 10/2016 | Gonen |
| 2016/0300297 A1* | 10/2016 | Kekalainen ............ G06Q 10/08 |
| 2016/0321619 A1* | 11/2016 | Inan ..................... G06Q 10/30 |
| 2016/0334236 A1 | 11/2016 | Mason et al. |
| 2016/0335814 A1 | 11/2016 | Tamari et al. |
| 2016/0372225 A1 | 12/2016 | Lefkowitz et al. |
| 2016/0377445 A1 | 12/2016 | Rodoni |
| 2016/0379152 A1 | 12/2016 | Rodoni |
| 2016/0379154 A1 | 12/2016 | Rodoni |
| 2017/0008671 A1 | 1/2017 | Whitman et al. |
| 2017/0011363 A1 | 1/2017 | Whitman et al. |
| 2017/0029209 A1* | 2/2017 | Smith ................. G07C 9/00896 |
| 2017/0046528 A1 | 2/2017 | Lambert |
| 2017/0061222 A1 | 3/2017 | Hoye et al. |
| 2017/0076249 A1 | 3/2017 | Byron et al. |
| 2017/0081120 A1 | 3/2017 | Liu et al. |
| 2017/0086230 A1 | 3/2017 | Azevedo et al. |
| 2017/0109704 A1 | 4/2017 | Lettieri et al. |
| 2017/0116583 A1 | 4/2017 | Rodoni |
| 2017/0116668 A1 | 4/2017 | Rodoni |
| 2017/0118609 A1 | 4/2017 | Rodoni |
| 2017/0121107 A1 | 5/2017 | Flood et al. |
| 2017/0124533 A1 | 5/2017 | Rodoni |
| 2017/0154287 A1 | 6/2017 | Kalinowski et al. |
| 2017/0176986 A1 | 6/2017 | High et al. |
| 2017/0193798 A1 | 7/2017 | Call et al. |
| 2017/0200333 A1 | 7/2017 | Plante |
| 2017/0203706 A1 | 7/2017 | Reed |
| 2017/0221017 A1 | 8/2017 | Gonen |
| 2017/0243269 A1 | 8/2017 | Rodini et al. |
| 2017/0243363 A1 | 8/2017 | Rodini |
| 2017/0277726 A1 | 9/2017 | Huang et al. |
| 2017/0308871 A1 | 10/2017 | Tallis |
| 2017/0330134 A1 | 11/2017 | Botea et al. |
| 2017/0344959 A1 | 11/2017 | Bostick et al. |
| 2017/0345169 A1 | 11/2017 | Rodoni |
| 2017/0350716 A1 | 12/2017 | Rodoni |
| 2017/0355522 A1 | 12/2017 | Salinas et al. |
| 2017/0364872 A1 | 12/2017 | Rodoni |
| 2018/0012172 A1 | 1/2018 | Rodoni |
| 2018/0025329 A1 | 1/2018 | Podgorny et al. |
| 2018/0075417 A1 | 3/2018 | Gordon et al. |
| 2018/0158033 A1 | 6/2018 | Woods et al. |
| 2018/0194305 A1 | 7/2018 | Reed |
| 2018/0245940 A1 | 8/2018 | Dong et al. |
| 2018/0247351 A1 | 8/2018 | Rodoni |
| 2019/0005466 A1 | 1/2019 | Rodoni |
| 2019/0019167 A1 | 1/2019 | Candel et al. |
| 2019/0050879 A1 | 2/2019 | Zhang et al. |
| 2019/0056416 A1 | 2/2019 | Rodoni |
| 2019/0065901 A1 | 2/2019 | Amato et al. |
| 2019/0196965 A1 | 6/2019 | Zhang et al. |
| 2019/0197498 A1 | 6/2019 | Gates et al. |
| 2019/0210798 A1 | 7/2019 | Schultz |
| 2019/0217342 A1 | 7/2019 | Parr et al. |
| 2019/0244267 A1 | 8/2019 | Rattner et al. |

(56) References Cited

U.S. PATENT DOCUMENTS

| | | |
|---|---|---|
| 2019/0311333 A1 | 10/2019 | Kekalainen et al. |
| 2020/0109963 A1 | 4/2020 | Zass |
| 2020/0175556 A1 | 6/2020 | Podgorny |

FOREIGN PATENT DOCUMENTS

| | | |
|---|---|---|
| CN | 101482742 | 7/2009 |
| CN | 101512720 | 8/2009 |
| CN | 105787850 | 7/2016 |
| CN | 105929778 | 9/2016 |
| CN | 106296416 | 1/2017 |
| DE | 69305435 | 4/1997 |
| DE | 69902531 | 4/2003 |
| DE | 102012006536 | 10/2013 |
| EP | 577540 | 10/1996 |
| EP | 1084069 | 8/2002 |
| EP | 2028138 | 2/2009 |
| GB | 2447184 | 9/2008 |
| JP | 3662616 | 6/2005 |
| JP | 2012-206817 | 10/2012 |
| JP | 2013-142037 | 7/2013 |
| WO | 99/54237 | 10/1999 |
| WO | 2007/067772 | 6/2007 |
| WO | 2007/067775 | 6/2007 |
| WO | 2012/069839 | 5/2012 |
| WO | 2012/172395 | 12/2012 |
| WO | 2016/074608 | 5/2016 |
| WO | 2016/187677 | 12/2016 |
| WO | 2017/070228 | 4/2017 |
| WO | 2017/0179038 | 10/2017 |
| WO | 2018/182858 | 10/2018 |
| WO | 2018/206766 | 11/2018 |
| WO | 2018/215682 | 11/2018 |

OTHER PUBLICATIONS

Nilopherjan, N. et al.; Automatic Garbage Volume Estimation Using SIFT Features Through Deep Neural Networks and Poisson Surface Reconstruction; International Journal of Pure and Applied Mathematics; vol. 119, No. 14; 2015 pp. 1101-1107.

Ghongane, Aishwarya et al; Automatic Garbage Tracking and Collection System; International Journal of Advanced Technology in Engineering and Science; vol. 5, No. 4; Apr. 2017; pp. 166-173.

Rajani et al.; Waste Management System Based on Location Intelligence; 4 pages; Poojya Doddappa Appa Colleage of Engineering, Kalaburgi.

Waste Management Review; A clear vison on waste collections; Dec. 8, 2015; 5 pages; http://wastemanagementreiew.com/au/a-clear-vison-on-waste-collections/.

Waste Management Surveillance Solutiosn; Vehicle Video Cameral; Aug. 23, 2017; 6 pages; http://vehiclevideocameras.com/mobile-video-applications/waste-management-camera.html.

Rich, John I.; Truck Equipment: Creating a Safer Waste Truck Environment; Sep. 2013; pp. 18-20; WasteAdvantage Magainze.

Town of Prosper; News Release: Solid Waste Collection Trucks Equipped wit "Third Eye," video system aborad trash and recycling trucks to improve service; Jan. 13, 2017; 1 page; U.S.

Product News Network; Telematics/Live Video System Increases Driver Safety/Productivity; Mar. 30, 2015; 3 pages; Thomas Industrial Network, Inc.

Karidis, Arlene; Waste Pro to Install Hight-Tech Camera Systems in all Trucks to Address Driver Safety; Mar. 10, 2016; 2 pages; Wastedive.com.

Greenwalt, Megan; Finnish Company Uses IoT to Digitize Trash Bins; Sep. 14, 2016; 21 pages; www.waste360.com.

Georgakopoulos, Chris; Cameras Cut Recycling Contamination; The Daily Telegraph; Apr. 7, 2014; 2 pages.

Van Dongen, Matthew; Garbage 'Gotcha' Videos on Rise in City: Residents Irked Over Perceived Infractions; Nov. 18, 2015; 3 pages; The Spectator.

The Advertiser; Waste Service Drives Innovation; Jan. 25, 2016; 2 pages; Fairfax Media Publications Pty Limited; Australia.

Sein, Myint Myint et al.; Trip Planning Query Based on Partial Sequenced Route Algorithm; 2019 IEEE 8th Global Conference; pp. 778-779.

A.F., Thompson et al.; Application of Geographic Information System to Solid Waste Management; Pan African International Conference on Information Science, Computing and Telecommunications; 2013; pp. 206-211.

Malakahmad, Amirhossein et al.; Solid Waste Collection System in Ipoh City, A Review; 2011 International Conference on Business, Engineering and Industrial Applications; pp. 174-179.

Cardinal Intellectual Property; Patentability Search; 24 pages; Oct. 3, 2019; U.S.

rwp-wasteportal.com; Waste & Recycling Data Portal and Software; 16 pages; printed Oct. 3, 2019.

Bhargava, Hermant K. et al.; A Web-Based Decision Support System for Waste Disposal and Recycling; pp. 47-65; 1997; Comput. Environ. and Urban Systems, vol. 21, No. 1; Pergamon.

Kontokasta, Constantine E. et al.; Using Machine Learning and Small Area Estimation to Predict Building-Level Municipal Solid Waste Generation in Cities; pp. 151-162; 2018; Computer, Envieonment and Urban Systems; Elsevier.

Ferrer, Javier et al.; BIN-CT: Urban Waste Collection Based on Predicting the Container Fill Level; Apr. 23, 2019; 11 pages; Elsevier.

Vu, Hoang Lan et al.; Waste Management: Assessment of Waste Characteristics and Their Impact on GIS Vechicle Collection Route Optimization Using ANN Waste Forecasts; Environmental Systems Engineering; Mar. 22, 2019; 13 pages; Elsevier.

Hina, Syeda Mahlaqa; Municipal Solid Waste Collection Route Optimization Using Geospatial Techniques: A Case Study of Two Metropolitan Cities of Pakistan; Feb. 2016; 205 pages; U.S.

Kannangara, Miyuru et al.; Waste Management: Modeling and Prediction of Regional Municipal Soid Waste Generation and Diversion in Canada Using Machine Learning Approaches; Nov. 30, 2017; 3 pages; Elsevier.

Tan, Kah Chun et al.; Smart Land: AI Waste Sorting System; University of Malaya; 2 pages; Keysight Techonogies.

Oliveira, Veronica et al.; Journal of Cleaner Production: Artificial Neural Network Modelling of the Amount of Separately-Collected Household Packaging Waste; Nov. 8, 2018; 9 pages; Elsevier.

Zade, Jalili Ghazi et al.; Prediction of Municipal Solid Waste Generation by Use of Artificial Neural Network: A Case Study of Mashhad; Winter 2008; 10 pages; Int. J. Environ. Res., 2(1).

\* cited by examiner

SYSTEM AND METHOD FOR AUDITING THE FILL STATUS OF A CUSTOMER WASTE CONTAINER BY A WASTE SERVICES PROVIDER DURING PERFORMANCE OF A WASTE SERVICE ACTIVITY

BACKGROUND

1. Field of the Invention

The presently disclosed subject matter relates to waste management, and more particularly, to a waste management system for auditing a fill status of a customer waste container by a waste services provider during performance of a waste service activity.

2. Description of the Related Art

Waste service vehicles and waste container delivery vehicles used in the waste collection, disposal and recycling industry often have on-board computers, location devices and interior and exterior safety and non-safety related cameras installed on the exterior and interior thereof. These systems can provide waste services providers and their field managers with information related to the waste service vehicle, location of the waste service vehicle, waste service confirmation, customer service issues, service routing issues, customer site information and safety issues and concerns.

A common concern for waste services providers is overloaded customer containers. Containers with trash or recyclables protruding from the top or sides can result in scattered contents and possible injury or accidents. Waste services providers have sought improved means for identifying and addressing and/or preventing overloaded containers. Waste services providers have also sought improved means for auditing the status of customer waste containers, including but not limited to the container fill status, during performance of a waste service activity.

Prior auditing means were typically performed visually by the driver or other employees at the site of the customer waste container, and were often inefficient and/or provided inaccurate results.

Improvements in this field of technology are desired.

SUMMARY

Various illustrative embodiments of a system for auditing the fill status of a customer waste container by a waste services provider during performance of a waste service activity are disclosed herein.

In certain aspects, the system can include an optical sensor disposed on a waste collection vehicle and configured to capture image data of the customer waste container that is indicative of the fill status of the container. The system can also include a memory storage area and a processor in communication with the memory storage area. The processor can be configured to, in real time during performance of the waste service activity: receive the image data from the optical sensor; compare the fill status from the image data to a predetermined overload threshold condition for the customer waste container stored in the memory storage area; determine, based on the comparison, whether the fill status has met or exceeded the predetermined overload threshold condition; if the fill status has met or surpassed the predetermined overload threshold condition, generate an action proposal; and execute an action from the action proposal, wherein the action can comprise one or more of: (i) a customer communication, (ii) a customer billing adjustment, and (iii) a container recovery instruction for the customer waste container for delivery to the waste collection vehicle. The comparing and determining can be performed using machine learning based on programmed data associated with recognition of the fill status. The container recovery instruction for the customer waste container for delivery to the waste collection vehicle can include an instruction to collect the customer waste container and deliver it to the waste collection vehicle for removal from the customer location. The processor can be configured to identify the location of the waste collection vehicle and associate the location of the waste collection vehicle with the identity of the specific customer at that location. The steps of identifying and associating can performed prior to receiving the image data from the optical sensor, or performed subsequent to receiving the image data from the optical sensor.

Various illustrative embodiments of a method for auditing the fill status of a customer waste container by a waste service provider during performance of a waste service activity are also disclosed herein.

In certain aspects, the method can include certain of the following steps: capturing image data of the customer waste container that is indicative of the fill status of the container; comparing the fill status from the image data to a predetermined overload threshold condition for the customer waste container; determining, based on the comparison, whether the fill status has met or exceeded the predetermined overload threshold condition; if the fill status has met or surpassed the predetermined overload threshold condition, generating an action proposal; and executing an action from the action proposal, wherein the action comprises one or more of: a customer communication, a customer billing adjustment, and a container recovery instruction for the customer waste container for delivery to the waste collection vehicle.

BRIEF DESCRIPTION OF THE DRAWINGS

A better understanding of the presently disclosed subject matter can be obtained when the following detailed description is considered in conjunction with the drawings and figures herein, wherein.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

The presently disclosed subject matter relates to systems and methods for auditing the status of a customer waste container by a waste services provider using video/still images captured by one or more optical sensors mounted on a waste collection vehicle used in the waste collection, disposal and recycling industry. The presently disclosed systems and methods are directed to overcoming the issues and problems of the prior art.

Figure 1:
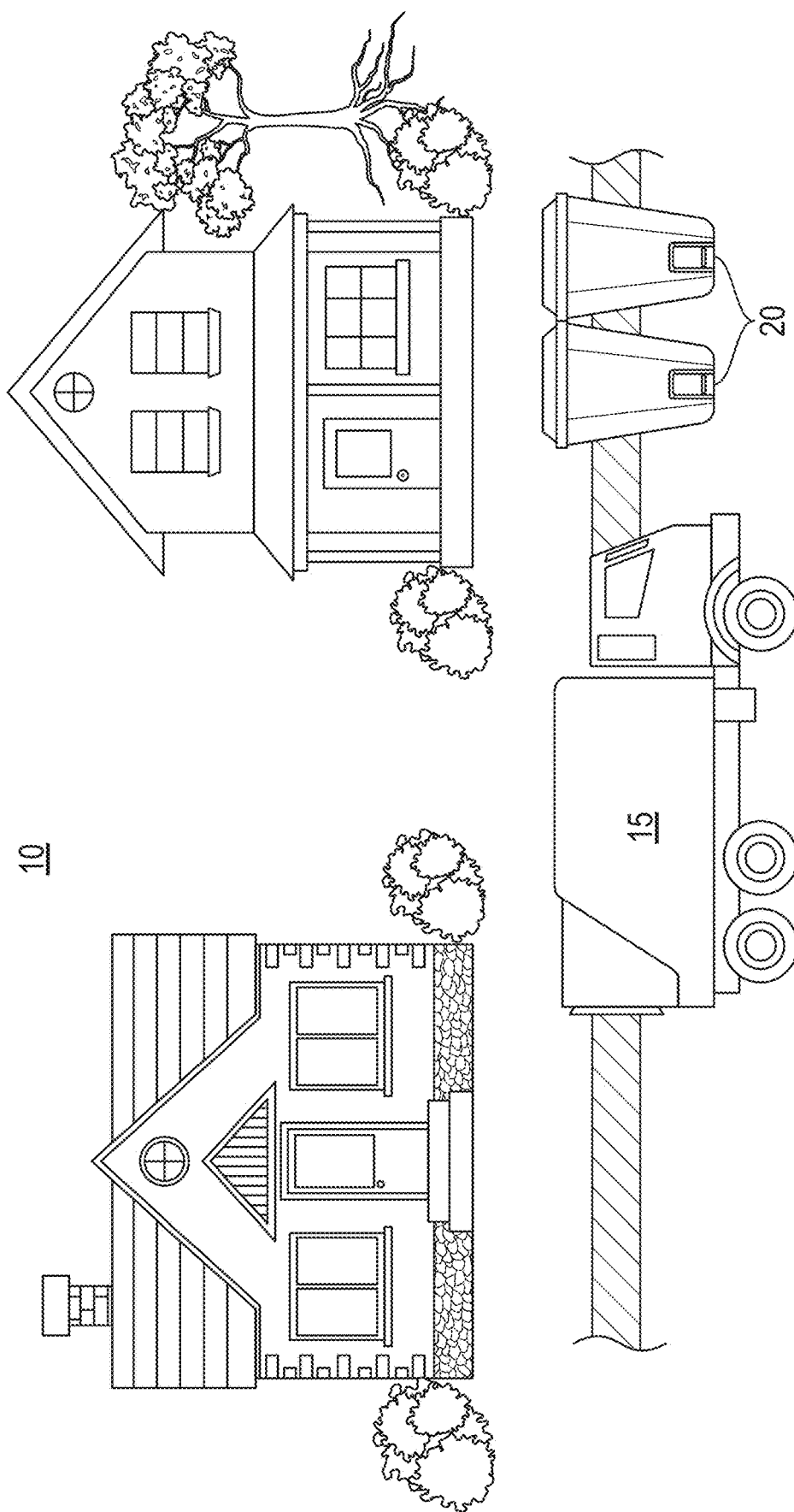
FIG. 1 is a representative example of a waste services environment where a waste service vehicle is configured to capture images from vehicle mounted optical sensors of customer waste containers and other service related and non-service related activity outside of the waste service vehicle in accordance with an illustrative embodiment of the presently disclosed subject matter.

FIG. 1 is an example of a waste services environment 10 where the presently disclosed system and method can be utilized. A waste service vehicle 15 is configured to provide services to customers, which can include typical lines of waste industry services such as waste collection and transport and/or recycling for commercial, residential and/or industrial. Waste service vehicle 15 collects waste or recyclables from a plurality of containers 20 which will typically be assisgned to, or associated with, specific customers registered to a waste collection company.

Figure 2:
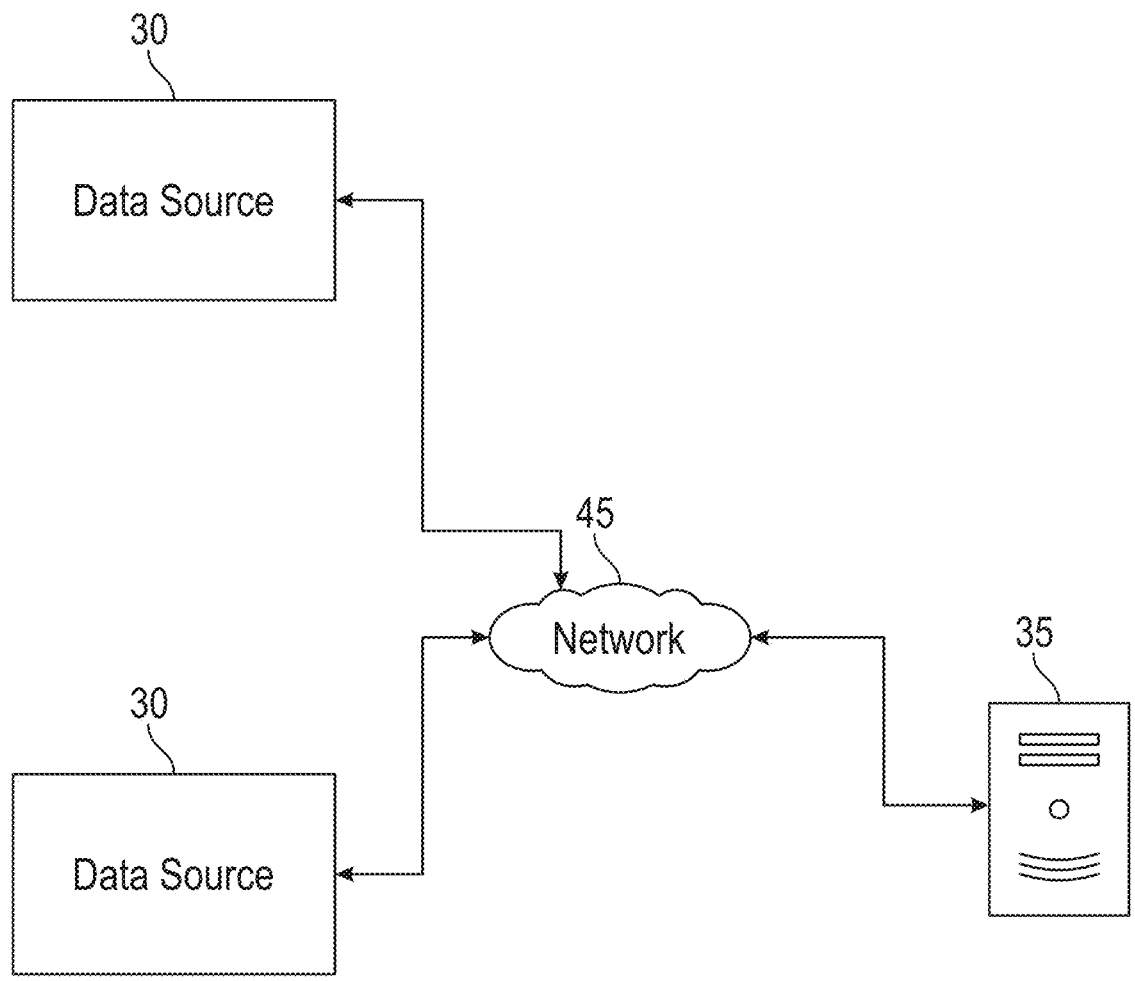
FIG. 2 is a system for auditing a status of a customer waste container by a waste services provider during performance of a waste service activity in the environment of FIG. 1, in accordance with an illustrative embodiment of the presently disclosed subject matter.

FIG. 2 illustrates a high-level overview of a system and network according to various illustrative embodiments herein. The components and general architecture of the system and network may be adapted for use in the specific waste services environment of FIG. 1. The system can include one or more data sources 30 and a central server 35. Data sources 30 may be, for example, devices configured for capturing and communicating operational data indicative of one or more operational characteristics (e.g., one or more optical sensors 40 on waste service vehicle 15 capturing video or still images of containers 20). Data sources 30 are configured to communicate with central server 35 by sending and receiving operational data over a network 45 (e.g., the Internet, an Intranet, or other suitable network). Central server 35 may be configured to process and evaluate operational data received from data sources 30 in accordance with user input received via a user interface provided on a local or remote computer.

Figure 3A:
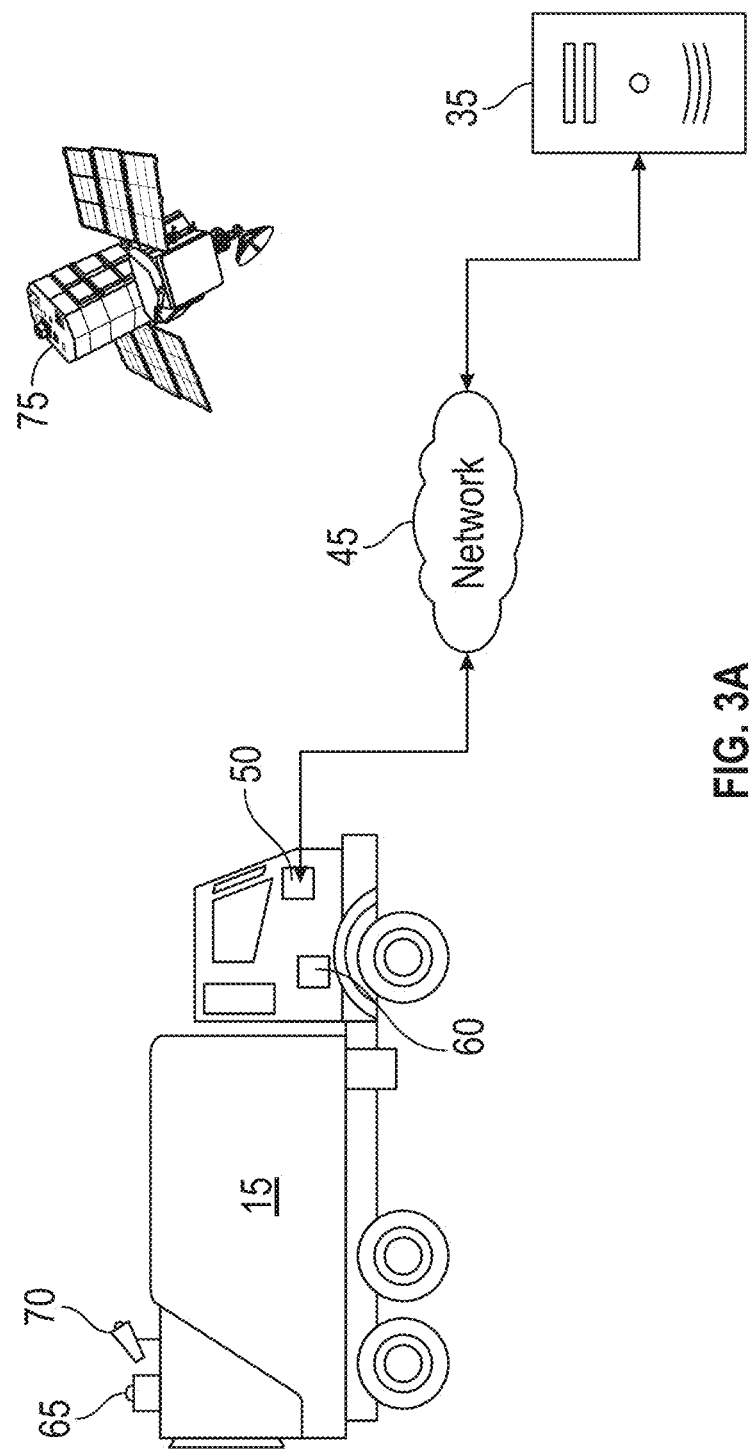
FIG. 3A is an example of a communications network in accordance with an illustrative embodiment of the presently disclosed subject matter.
Figure 3B:
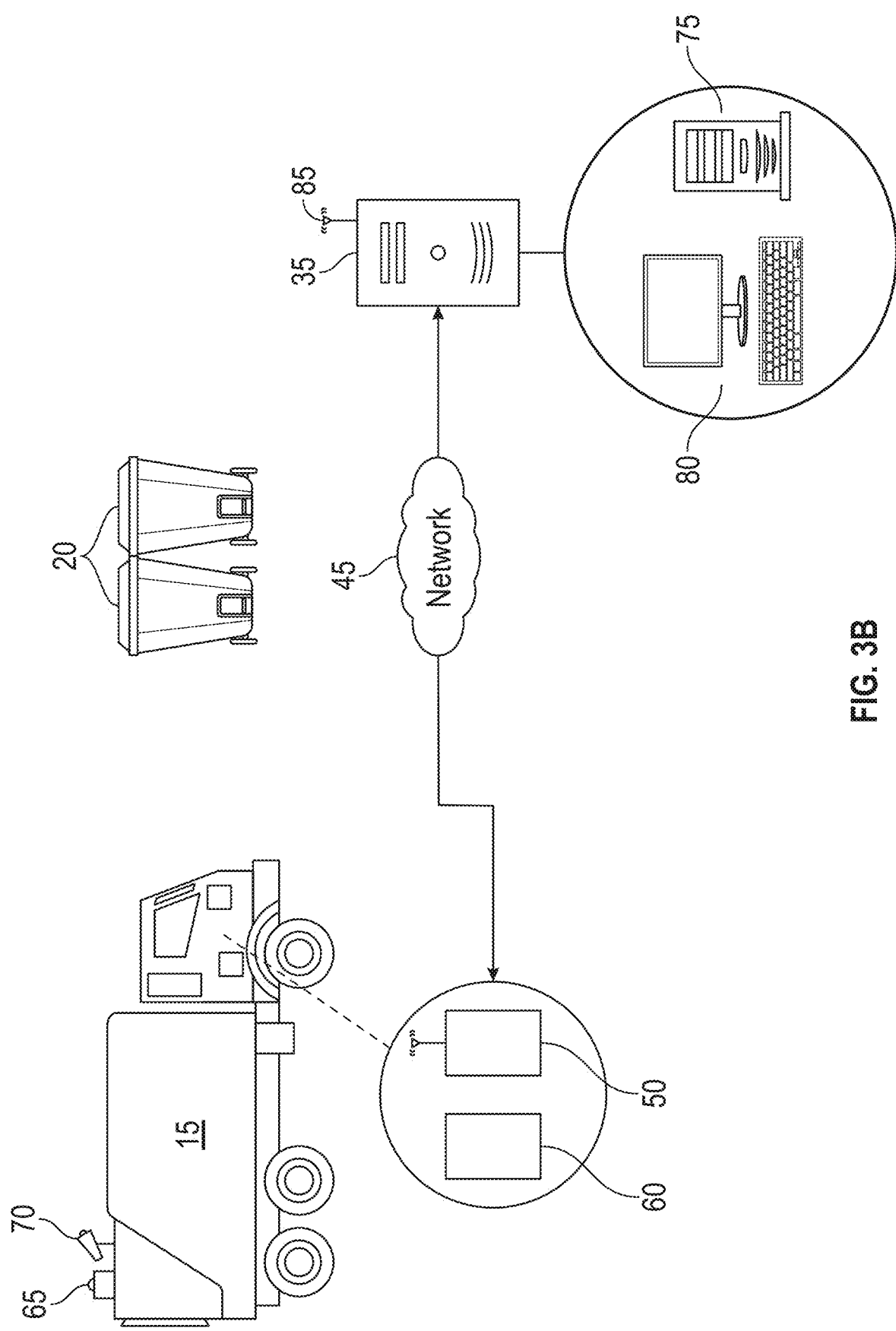
FIG. 3B is an example of a communications network for a waste services vehicle in accordance with an illustrative embodiment of the presently disclosed subject matter.
Figure 4:
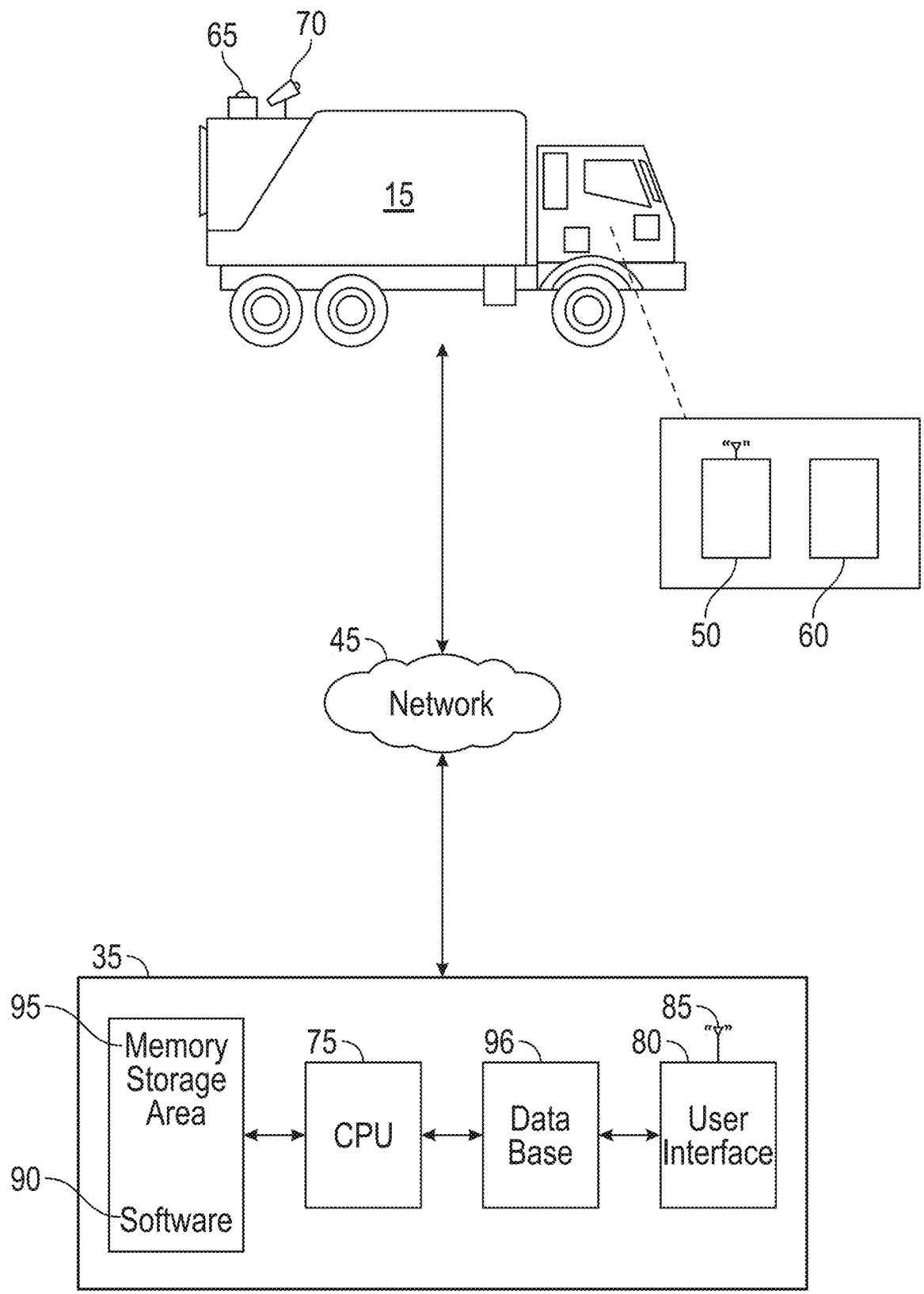
FIG. 4 is an example of a computing system in accordance with an illustrative embodiment of the presently disclosed subject matter.

In the illustrative embodiment shown in FIGS. 3A, 3B and 4, a system and network are shown wherein a communications device 50 can be disposed on waste service vehicle 15. Communications device 50 and central server 35 are configured to communicate with each other via a communications network 45 (e.g., the Internet, an Intranet, a cellular network, or other suitable network). In addition, communications device 50 and central server 35 are configured for storing data to an accessible central server database 96 located on, or remotely from, central server 35. In the description provided herein, the system may be configured for managing and evaluating the operation of a large fleet of waste service vehicles 15. As such, in certain illustrative embodiments, the system may further comprise a plurality of communications devices 50, each being associated with one of a plurality of waste service vehicles 15.

In certain illustrative embodiments, the communication between communications device 50 provided on-board waste service vehicle 15 and central server 35 may be provided on a real time basis such that during the collection route, data is transmitted from each waste service vehicle 15 to central server 35. Alternatively, communication device 50 may be configured to temporarily store or cache data during the collection route and transfer the data to the central server 35 on return of waste service vehicle 15 to the location of the waste collection company.

In certain illustrative embodiments, as illustrated in FIG. 3B, waste service vehicle 15 can also include an onboard computer 60, a location device 65, and an optical sensor 70. Onboard computer 60 can be, for example, a standard desktop or laptop personal computer ("PC"), or a computing apparatus that is physically integrated with vehicle 15, and can include and/or utilize various standard interfaces that can be used to communicate with location device 65 and optical sensor 70. Onboard computer 60 can also communicate with central server 35 via a communications network 45 via communication device 50.

Location device 65 can be configured to determine the location of waste service vehicle 15 always while waste service vehicle 15 is inactive, in motion and operating and performing service related and nonservice related activities. For example, location device 65 can be a GPS device that can communicate with the waste collection company. A satellite 75 or other communications device can be utilized to faciliate communications. For example, location device 65 can transmit location information, such as digital latitude and longitude, to onboard computer 60 via satellite 75. Thus, location device 65 can identify the location of waste service vehicle 15, and therefore the location of the customer site where container 20 is located, after vehicle 15 has arrived at the customer site.

In certain illustrative embodiments, optical sensor 70 can be configured to capture still or video images of containers 20 as well as other service related and non-service related activity outside of the waste service vehicle 15. Optical sensor 70 can be, for example, a video camera. Optical sensor 70 can be disposed on waste collection vehicle 15 and configured to capture image data of customer waste container 20 that is indicative of the fill status of container 20. The images collected by optical sensor 70 may be transmitted to and stored by onboard computer 60, and/or delivered to central server 35.

For example, in certain illustrative embodiments one or more optical sensors 70 can be installed throughout the waste collection vehicle 15 including, but not limited to, high definition cameras, monitors and such other sensors mounted to the front (interior and exterior of the cab), exterior right side, exterior left side, exterior rear and exterior/interior hopper area of the service vehicle. Optical sensor 70 can periodically or continuously record, or record upon demand, desired activities outside the vehicle 15. The recorded images and data can be stored on onboard computer 60 using a recording device (such as a digital video recorder) and be also be transmitted and stored remotely away from waste service vehicle 15 or in the "cloud" via cellular and/or other wireless transmissions and/or communicate vis network 45. The images can be available for review in immediate real-time or passive review later by an end-user.

In the illustrative embodiment of FIG. 4, a exemplary computer system and associated communication network is shown. In certain illustrative embodiments, central server 35 can be configured to receive and store operational data (e.g., data received from waste services vehicle 15) and evaluate the data to aid waste services company in improving operational efficiency. Central server 35 can include various means for performing one or more functions in accordance with embodiments of the present invention, including those more particularly shown and described herein; however, central server 35 may include alternative devices for performing one or more like functions without departing from the spirit and scope of the present invention.

In certain illustrative embodiments, central server 35 can include standard components such as processor 75 and user interface 80 for inputting and displaying data, such as a keyboard and mouse or a touch screen, associated with a standard laptop or desktop computer. Central server 35 also includes a communication device 85 for wireless communication with onboard computer 60.

Central server 35 may include software 90 that communicates with one or more memory storage areas 95. Memory storage areas 95 can be, for example, multiple data repositories which stores pre-recorded data pertaining to a plurality of customer accounts. Such information may include customer location, route data, items expected to be removed from the customer site, and/or billing data. For example, using the location (e.g., street address, city, state, and zip code) of a customer site, software 90 may find the corresponding customer account in memory storage areas 95. Database 96 for data storage can be in memory storage area 95 and/or supplementary external storage devices as are well known in the art.

While a "central server" is described herein, a person of ordinary skill in the art will recognize that embodiments of the present invention are not limited to a client-server architecture and that the server need not be centralized or limited to a single server, or similar network entity or mainframe computer system. Rather, the server and computing system described herein may refer to any combination of devices or entities adapted to perform the computing and networking functions, operations, and/or processes described herein without departing from the spirit and scope of embodiments of the present invention.

In certain illustrative embodiments, a system is provided for auditing the fill status of a customer waste container 20 by a waste services provider during performance of a waste service activity. Optical sensor 70 is disposed on waste collection vehicle 15 and configured to capture image data of customer container 20 that is indicative of the fill status of container 20. Central server 35 may utilize memory storage area 95, and processor 75 in communication with memory storage area 95 to, in real time during performance of the waste service activity, receive the image data from optical sensor 70, compare the fill status from the image data to a predetermined overload threshold condition (or "POTC") for customer container 20 stored in memory storage area 95, and determine, based on the comparison, whether the fill status has met or exceeded the predetermined overload threshold condition. If the fill status has met or surpassed the predetermined overload threshold condition, an action proposal can be generated, from which one or more actions can be executed. The actions can comprise, for example, one or more of: (i) a customer communication, (ii) a customer billing adjustment, and (iii) a container recovery instruction for customer container 20 for delivery to waste collection vehicle 15.

The presently disclosed waste management system can allow a waste service provider to audit the status of a customer waste container 20 during performance of a waste service activity. In certain illustrative embodiments, the system and method disclosed herein can also be utilized to perform "audits" in industries other than the waste industry, where auditing of containers using optical sensors and associated computer functionality are utilized.

In certain illustrative embodiments, software 90 can execute the flow of the method steps of FIGS. 5-8 interacting with the various system elements of FIGS. 1-4. In the illustrative embodiment shown in FIG. 5, the method can be initiated when an image or video of a customer container is received from an optical sensor on a waste service vehicle (Step 501). The location of the waste service vehicle can then be identified (Step 502), and can be associated with a customer identity in the database based on stored customer information such as address (Step 503). Once the customer identity is established, a determination can be made of whether the fill status of the customer waste container in the image or video meets or exceeds the predetermined overload threshold condition ("POTC") for that particular customer (Step 504). If the answer is yes, an action proposal for the customer can be generated (Step 505). If desired, user input can be utilized to analyze the action proposal, and amend as necessary. For example, the user can pick one or more of these options from the action proposal for execution. One or more actions can then be executed from the action proposal (Step 506).

Figure 5:
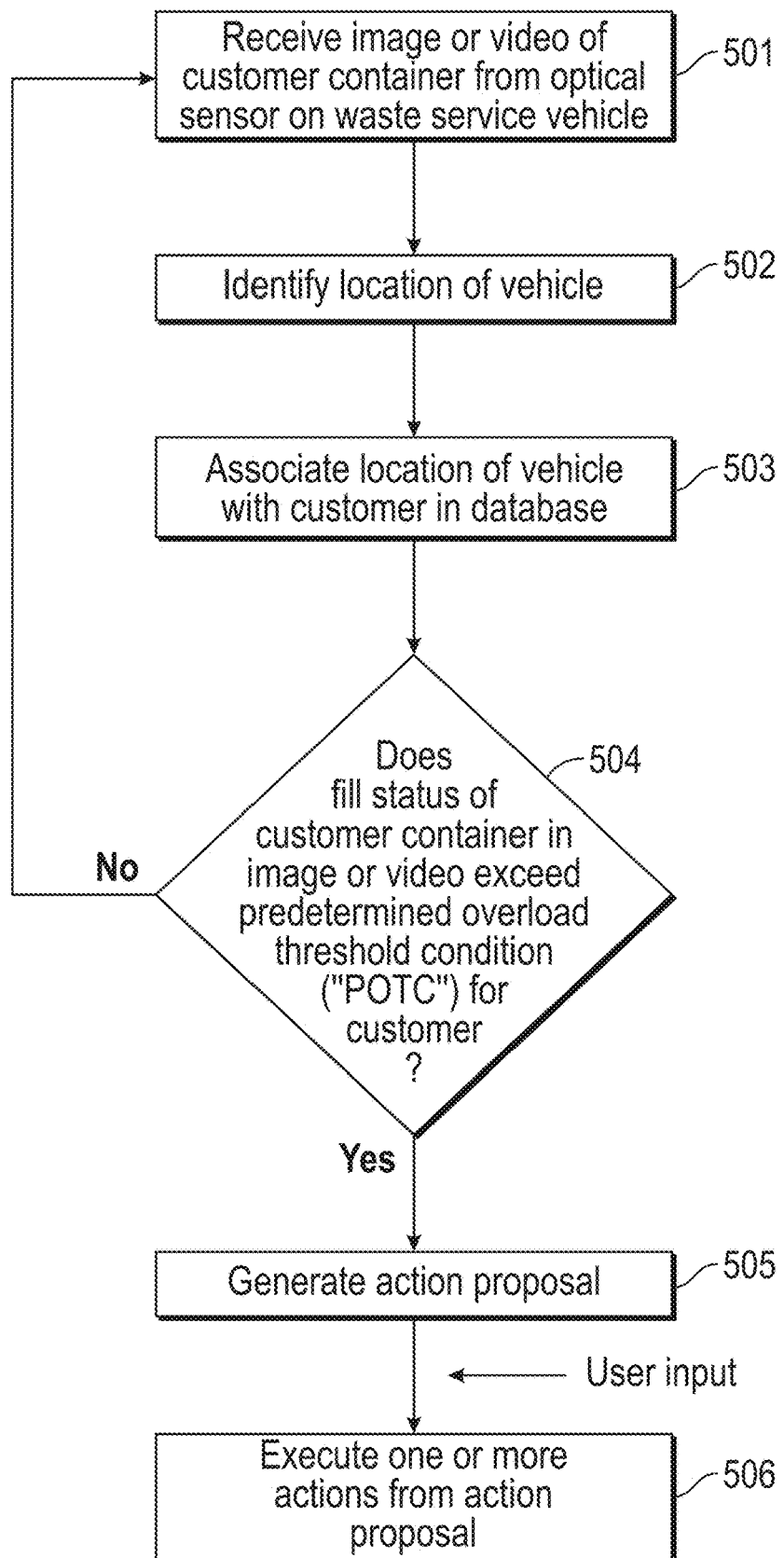
FIG. 5 is a flowchart for auditing the container fill status of a customer waste container during performance of a waste service activity in accordance with an illustrative embodiment of the presently disclosed subject matter.
Figure 6:
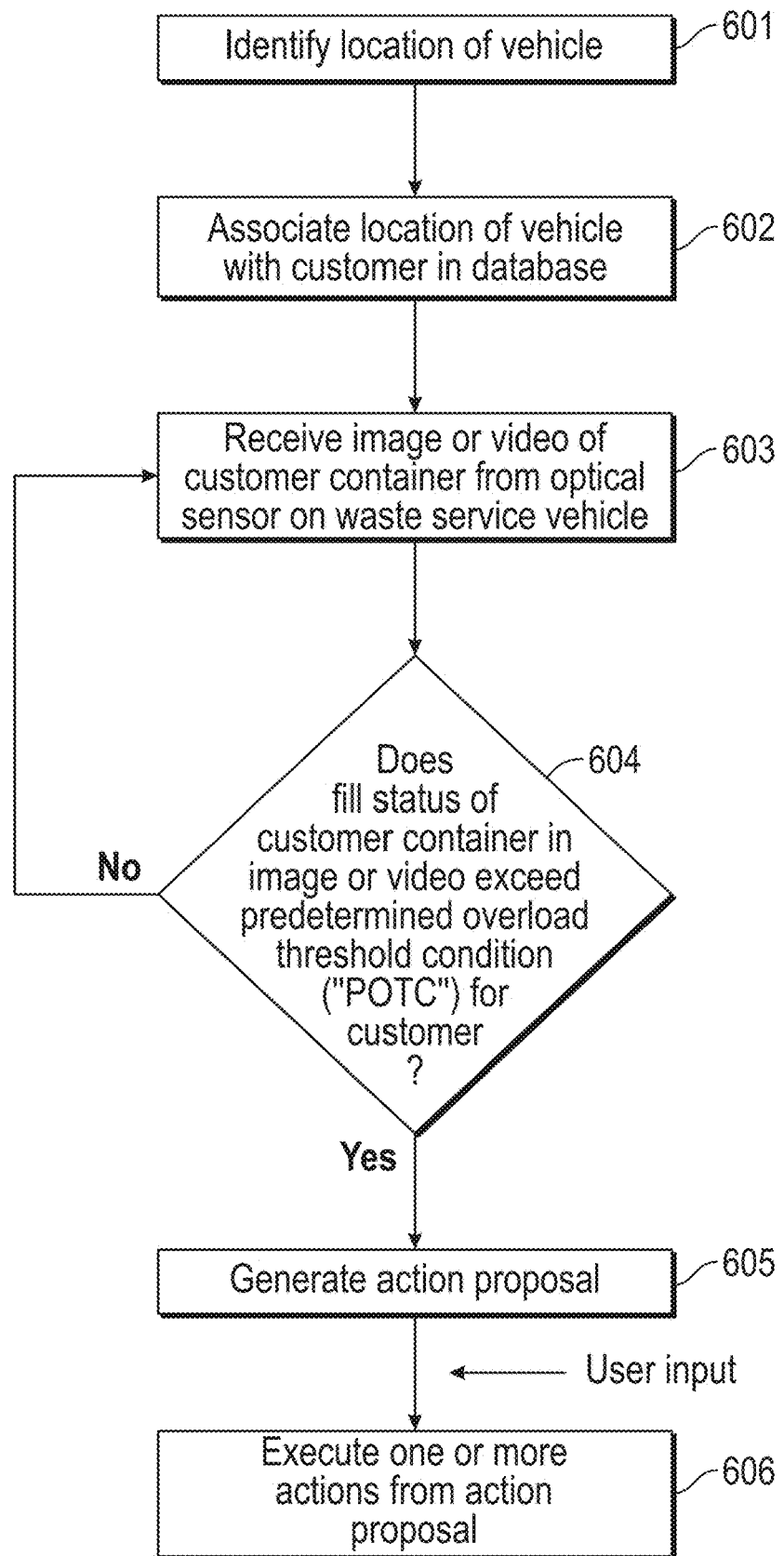
FIG. 6 is a flowchart for auditing the container fill status of a customer waste container during performance of a waste service activity in accordance with an illustrative embodiment of the presently disclosed subject matter.

In the illustrative embodiment shown in FIG. 6, the method can be initiated when the location of the waste service vehicle is identified (Step 601). The location of the waste service vehicle can then be associated with a customer identity in the database based on stored customer information such as address (Step 602). An image or video of a customer container can be received from an optical sensor on a waste service vehicle (Step 603), and a determination can be made of whether the fill status of the customer waste container in the image or video meets or exceeds the predetermined overload threshold condition ("POTC") for that particular customer (Step 604). If the answer is yes, an action proposal for the customer can be generated (Step 605). If desired, user input can be utilized to analyze the action proposal, and amend as necessary. For example, the user can pick one or more of these options from the action proposal for execution. One or more actions can then be executed from the action proposal (Step 606). The illustrative embodiment shown in FIG. 6 differs from that shown in FIG. 5 in that the identification of the location of the vehicle and the identity of the associated customer is performed before, instead of after, the image is received from the waste service vehicle.

Figure 7:
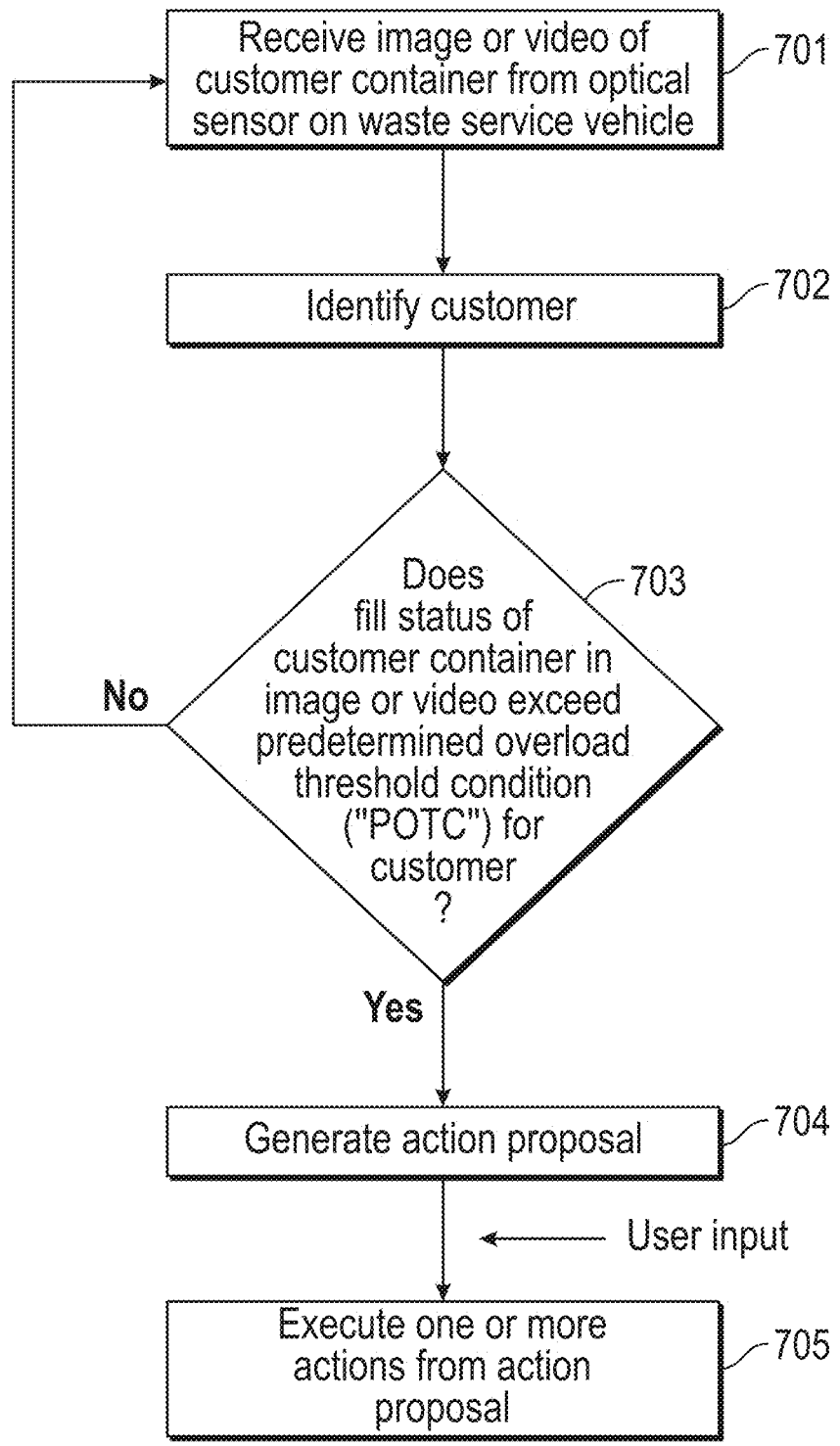
FIG. 7 is a flowchart for auditing the container fill status of a customer waste container during performance of a waste service activity in accordance with an illustrative embodiment of the presently disclosed subject matter.

In the illustrative embodiment shown in FIG. 7, the method can be initiated when an image or video of a customer container is received from an optical sensor on a waste service vehicle (Step 701). The customer can then be identified (Step 702), and associated with stored customer information in the database (Step 703). Next, a determination can be made of whether the fill status of the customer waste container in the image or video meets or exceeds the predetermined overload threshold condition ("POTC") for that particular customer (Step 704). If the answer is yes, an action proposal for the customer can be generated (Step 705). User input can be utilized to analyze the action proposal, and amend as necessary. For example, the user can pick one or more of these options from the action proposal for execution. One or more actions can then be executed from the action proposal (Step 706). The illustrative embodiment shown in FIG. 7 differs from that shown in FIG. 6 in that no location identifying is utilized to identify the customer. For example, the customer identify may already be known, or obtainable, via other means.

Figure 8:
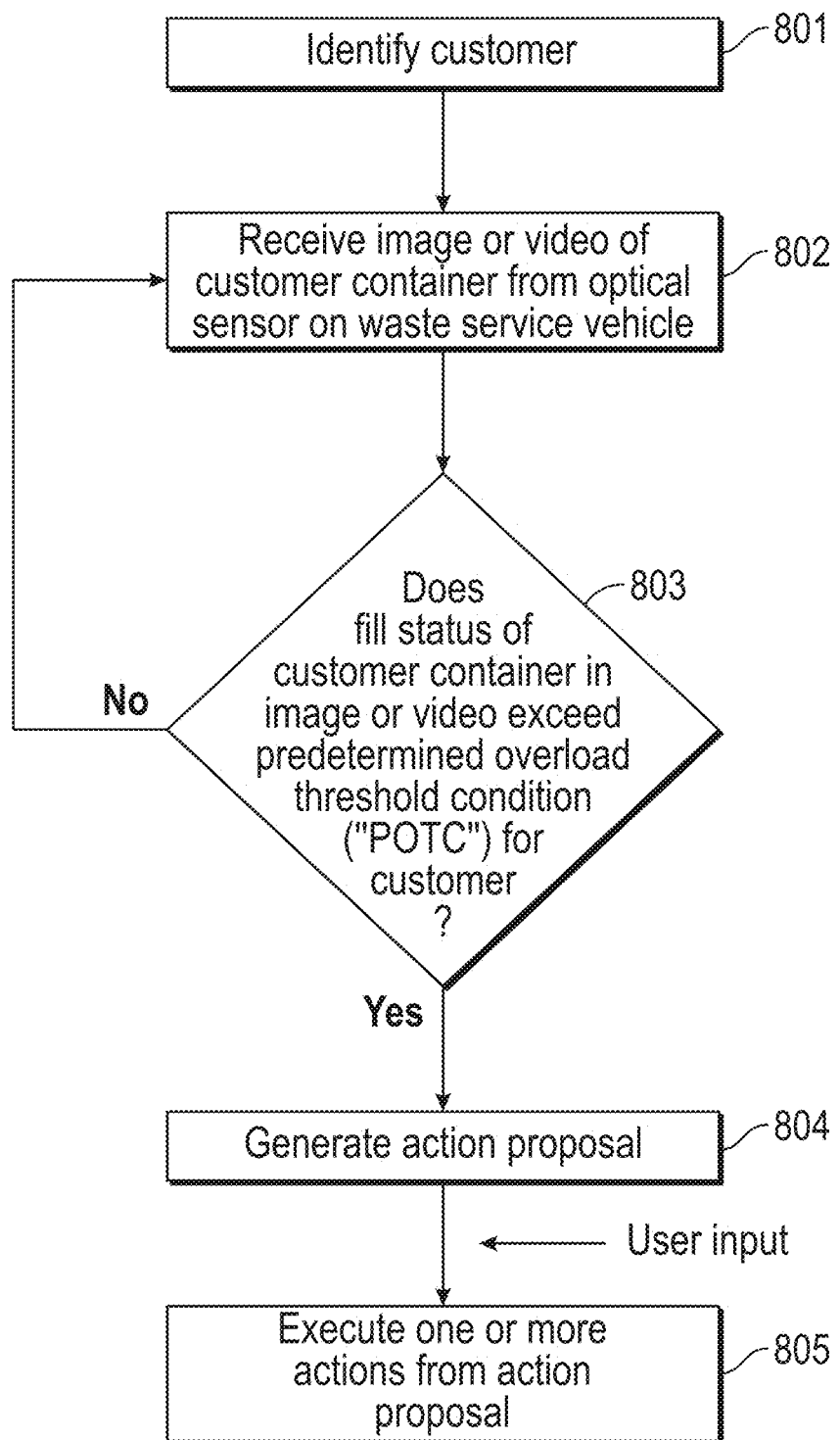
FIG. 8 is a flowchart for auditing the container fill status of a customer waste container during performance of a waste service activity in accordance with an illustrative embodiment of the presently disclosed subject matter.

In the illustrative embodiment shown in FIG. 8, the method can be initiated when the customer is identified (Step 801), and associated with stored customer information in the database. Next, an image or video of a customer container is received from an optical sensor on a waste service vehicle (Step 802). A determination can be made of whether the fill status of the customer waste container in the image or video meets or exceeds the predetermined overload threshold condition ("POTC") for that particular customer (Step 803). If the answer is yes, an action proposal for the customer can be generated (Step 804). User input can be utilized to analyze the action proposal, and amend as necessary. For example, the user can pick one or more of these options from the action proposal for execution. One or more actions can then be executed from the action proposal (Step 805). The illustrative embodiment shown in FIG. 8 differs from that shown in FIG. 7 in that the identity of the associated customer is performed before, instead of after, the image is received from the waste service vehicle.

Figure 9:
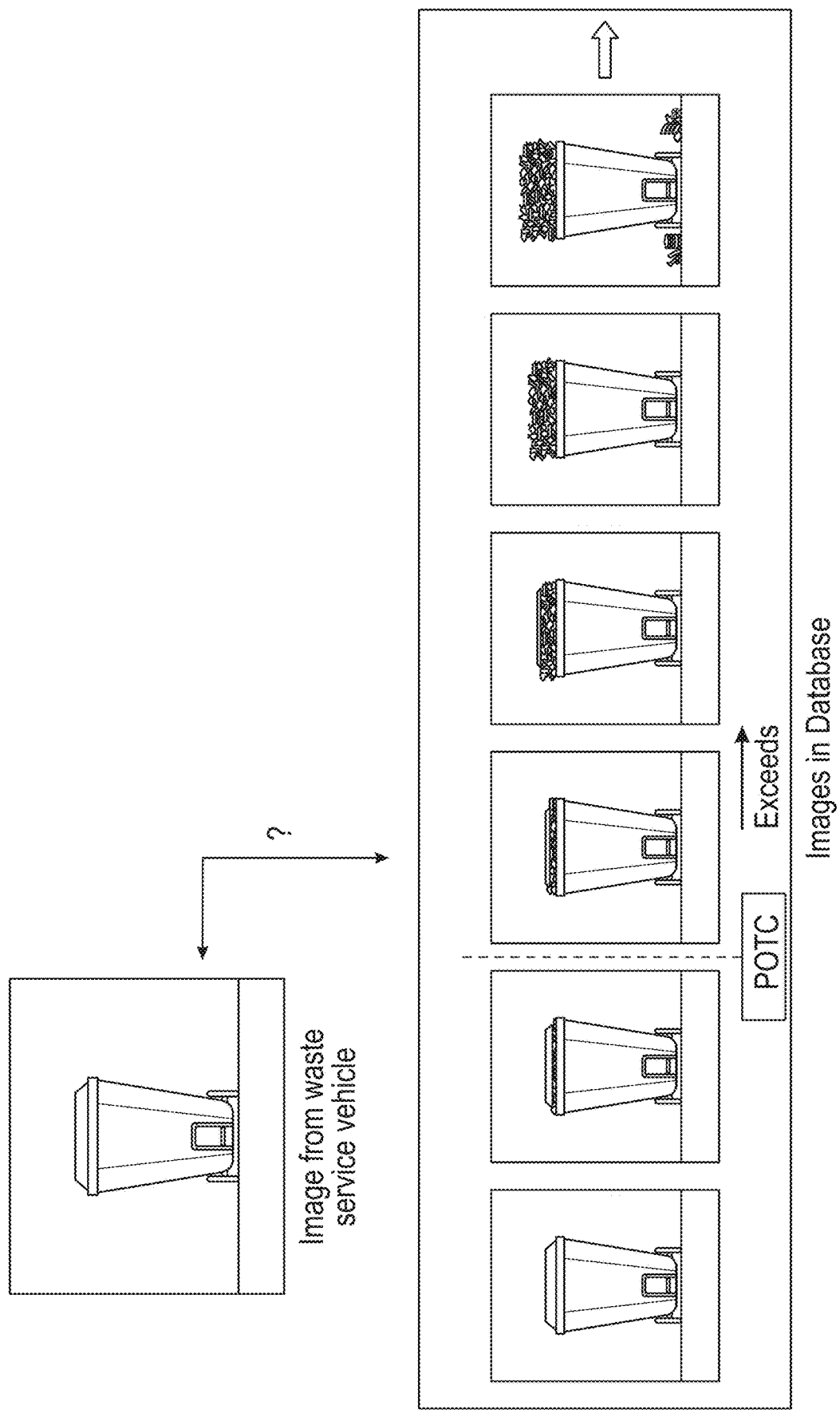
FIG. 9 is an illustration of a fill status from image data being compared to a predetermined overload threshold condition for a customer waste container in accordance with an illustrative embodiment of the presently disclosed subject matter.

In certain illustrative embodiments, and as illustrated in FIG. 9, the image(s) captured and stored by optical sensor 70 and communicated to central server 35 may be compared (e.g., by processor 75) with the pictures and/or descriptions stored in memory storage area 95 to determine if any objects in the image(s) match any particular picture and/or description, and thus meet or exceed predetermined overload threshold condition ("POTC"). FIG. 9 represents an overall depiction of how the determination could occur, in certain illustrative embodiments. In some cases, the images can be displayed on a video screen with graphical user interface for viewing and interaction by a user, such that the user can participate in making the determination.

In certain illustrative embodiments, the POTC can be customer specific. Alternatively, the POTC does not need to be associated with any particular customer, and can instead be a standard condition established by the waste service provider based on any number of conditions and requirements. If desired, a user of the system can double check or confirm the determination of "overloaded" status made by the processor by soliciting a visual confirmation from the driver onsite.

In certain illustrative embodiments, processor 75 may automatically review the accumulated images and determine whether predetermined overload threshold condition ("POTC") is met or exceeded based on machine learning and in association with programmed recognition patterns. In particular, processor 75 may be taught to recognize, for example, patterns of shapes, or sizes, that indicate trash protruding from the top or sides of container 20, based on existing in mages in the database. Object recognition software may also be used for this purpose. In the flowchart of FIG. 5, for example, if no objects within the image match the picture and/or description of the sought-after items when Step 504 is performed, control may return to Step 501. However, when one or more objects recognized in the image captured by optical sensor 70 substantially match (e.g., within a threshold margin) the picture and/or description received at Step 501, then an action proposal will be generated at Step 505.

In certain illustrative embodiments, the comparing and determining are performed using machine learning based on a set of programmed data associated with the predetermined overload threshold condition for the exemplary customer waste container. The set of programmed data can include a plurality of images of the exemplary customer waste container. Each image of the exemplary customer waste container can display a different exemplary fill status condition, where a first subsection of the plurality of images is pre-identified, based on the exemplary fill status condition, as meeting or exceeding the predetermined overload threshold condition, and where a second subsection of the plurality of images is pre-identified, based on the exemplary fill status condition, as not meeting or exceeding the predetermined overload threshold condition. The pre-identification of an image in the set of programmed data as meeting or exceeding, or not meeting or exceeding, the predetermined overload threshold condition can be based upon one or more features in the image such as an open or closed status of the lid of the exemplary customer waste container, a presence or absence of waste on the ground adjacent the exemplary customer waste container, or an identification of excess waste in a defined region above the rim of the exemplary customer waste container when the lid of the exemplary customer waste container is at least partially open. The processor can be trained, using machine learning or via programming, to recognize and identify the fill status of the customer waste container based on the image data received from the optical sensor. The recognition and identifying of the fill status of the customer waste container can also be based upon one or more features in the image data such an open or closed status of the lid of the customer waste container, a presence or absence of waste on the ground adjacent the customer waste container, and an identification of excess waste in a defined region above the rim of the customer waste container when the lid of the customer waste container is at least partially open. The processor can be trained, using machine learning, to match the recognized fill status of the customer waste container with the image of the exemplary customer waste container in the set of programmed data that has a corresponding fill status, and then to categorize the fill status of the customer waste container as either (i) meeting or exceeding, or (ii) not meeting or exceeding, the predetermined overload threshold condition.

In certain illustrative embodiments, one or more action proposals can be generated based on the identifications above. The actions proposals can include, for example, recommendations to (i) remove excess waste from customer container, (ii) remove and replace container, (iii) provide additional containers, (iv) provide reporting, education and/or instructions to customer, or (v) to adjust customer billing. In addition, historical account information and attributes of target customer and "like" customers can be collected, and the action proposals for target customers can be determined and ranked based on lifetime value impact scoring. Additional information can also be collected from the Internet or other outside sources. Scoring of target customer can be impacted based on prior proposals or interactions as well as preferences/acceptances of "like" customers to similar action proposals, and restrictions or constraints from target customer's attributes can be applied. Action proposals can be delivered to appropriate user/system for acceptance, and thereupon, the action proposal can be executed/applied, which can include charging the customer for the overage, notifying the customer of the overage through a proactive warning and notification process (including still images and/or video), and noting the overage incident on the customer's account.

In certain illustrative embodiments, a method is provided for collecting, processing, and applying data from a waste service vehicle to increase customer lifetime value through targeted action proposals. The method can include the steps of: collecting information (such as image, video, collection vehicle, driver inputs) at a target service location; matching customer account to a target service location; processing information from the target service location and historical customer account record to create an action proposal; and executing an action from the action proposal. The information that can be processed can include a variety of gathered information, for example, information regarding safety, receptacle condition, receptacle contents, fill status, site conditions, obstructions (temporary or permanent), service, service quality (verification, receptacle identification, receptacle contents), service audit (size, frequency, location, and quantity), service exceptions (unable to service, site obstructions), site damage, theft/poaching/no customer, sustainability, material diversion/audits, dangerous/hazardous materials, savings, site service times, bin locations and ancillary services (locks, gates, etc).

The presently disclosed subject matter has a variety of practical applications, as well as provides solutions to a number of technological and business problems of the prior art. For example, accuracy in customer billing is improved. A critical component of providing waste services to residential and commercial customers is accuracy in the customer's statement. The presently disclosed system and method allows the waste services provider to determine if the waste container or bin is overloaded resulting in the customer requiring additional service beyond the capacity of the container or bin. Improved management and education of customers regarding service requirements also occurs. An obligation of the waste service provider is to manage and educate the residential and commercial customer of the waste collection company's service requirements. The system and method of recording and auditing service related and non-service related activities outside of the waste collection vehicle allows the end-user to educate the customer on closing the container or bin lid to reduce capturing of precipitation, to reduce litter/blight, to reduce unauthorized dumping or use, and to reduce animals and vermin from intruding the container or bin, as well as the dangers and hardships associated with overloading a container or bin.

Improvements in employee and public safety also occur. An obligation of the waste service provider is to provide a safe working environment for its employees and its customers. The presently disclosed system and method allows the end-user to: (i) improve safety and protects its employees and equipment by reducing overloaded containers, which damage equipment, cause collection vehicle fires, cause other property damage from falling debris and otherwise puts its employees at risk; (ii) improve safety by identifying and abating dangerous stops and hard to service accounts, which result in vehicle accidents and employee injuries; (iii) improve safety and reduce vehicle accidents by having safe access to containers and bins; and (v) improve safety by identifying and correcting overloaded containers and bins at customer's service location.

Improved customer service can also be provided. The cornerstone of a successful waste collection provider is providing excellent customer service. The system and method disclosed herein allows the end-user to: (i) proactively notify the customer of waste collection service requirements to ensure safe and efficient waste collection; (ii) demonstrate a container is overloaded or unavailable for service and assist the customer in efforts to receive timely service; (iii) educate the customer on proper recycling and management of waste in each of the containers or bins; and (iv) proactively remove or repair damaged and/or leaking containers and bins.

Operational Improvements can also occur. Operational improvements result in more efficient waste collection services and ultimately improved earnings, safety and employee morale. The system and method disclosed herein allow the end-user to: (i) reduce overloaded containers resulting in less equipment damage, employee injuries and time off-route; (ii) improved route efficiencies by servicing readily accessible containers and bins; and (iii) supporting frontline employees by holding customer to waste collector's service requirements.

Those skilled in the art will appreciate that certain portions of the subject matter disclosed herein may be embodied as a method, data processing system, or computer program product. Accordingly, these portions of the subject matter disclosed herein may take the form of an entirely hardware embodiment, an entirely software embodiment, or an embodiment combining software and hardware. Furthermore, portions of the subject matter disclosed herein may be a computer program product on a computer-usable storage medium having computer readable program code on the medium. Any suitable computer readable medium may be utilized including hard disks, CD-ROMs, optical storage devices, or other storage devices. Further, the subject matter described herein may be embodied as systems, methods, devices, or components. Accordingly, embodiments may, for example, take the form of hardware, software or any combination thereof, and/or may exist as part of an overall system architecture within which the software will exist. The present detailed description is, therefore, not intended to be taken in a limiting sense.

It is to be understood that the present invention is not limited to the embodiment(s) described above and illustrated herein, but encompasses any and all variations falling within the scope of the appended claims.

What is claimed is:

1. A system for auditing the fill status of a customer waste container by a waste services provider during performance of a waste service activity, the system comprising:

an optical sensor disposed on a waste collection vehicle and configured to capture image data of the customer waste container that is indicative of the fill status of the container, wherein the customer waste container is located at a customer site and the direction of image capture for the optical sensor is outward facing with respect to the waste collection vehicle and towards the customer waste container at the customer site;

a memory storage area, and a processor in communication with the memory storage area and configured to, in real time during performance of the waste service activity: receive the image data from the optical sensor; compare the fill status from the image data of the customer waste container to a predetermined overload threshold condition for an exemplary customer waste container stored in the memory storage area; determine, based on the comparison, whether the fill status of the customer waste container has met or exceeded the predetermined overload threshold condition; if the fill status has met or surpassed the predetermined overload threshold condition, generate an action proposal; and execute an action from the action proposal, wherein the action comprises a customer communication, wherein the processor is trained, using machine learning, to recognize and identify the fill status of the customer waste container based on the image data received from the optical sensor, and wherein the recognition and identifying of the fill status of the customer waste container is based upon a feature in the image data comprising a programmed recognition pattern of shapes or sizes that indicate trash protruding from the top of the customer waste container, and wherein the predetermined overload threshold condition is associated with existing images stored in the memory storage area, and wherein generating an action proposal comprises:

collecting historical account information and attributes of the customer;

collecting historical account information and attributes of similar customers, wherein the similar customer are customers of the waste services provider;

developing a plurality of action proposals using the collected information; and scoring and ranking the action proposals to determine an action.

2. A method for auditing the fill status of a customer waste container by a waste service provider during performance of a waste service activity, the method comprising:

capturing image data of the customer waste container that is indicative of the fill status of the container, wherein the image data is captured using an optical sensor located on a waste collection vehicle, and wherein the customer waste container is located at a customer site and wherein the direction of image capture of the optical sensor is outward facing with respect to the waste collection vehicle and towards the customer waste container at the customer site;

comparing the fill status from the image data to a predetermined overload threshold condition for the customer waste container;

determining, based on the comparison, whether the fill status has met or exceeded the predetermined overload threshold condition, wherein the determination is made using machine learning to recognize and identify the fill status of the customer waste container based on the image data received from the optical sensor, and wherein the recognition and identifying of the fill status of the customer waste container is based upon a feature in the image data comprising a programmed recognition pattern of shapes or sizes that indicate trash protruding from the top of the customer waste container, and wherein the predetermined overload threshold condition is associated with existing images stored in the memory storage area;

if the fill status has met or surpassed the predetermined overload threshold condition, generating an action proposal; and executing an action from the action proposal, wherein the action comprises a customer communication, wherein generating an action proposal comprises:

collecting historical account information and attributes of the customer;

collecting historical account information and attributes of similar customers, wherein the similar customer are customers of the waste services provider;

developing a plurality of action proposals using the collected information; and scoring and ranking the action proposals to determine an action.

3. The system of claim 1, wherein the action further comprises a container recovery instruction for the customer waste container for delivery to the waste collection vehicle to collect the customer waste container and remove the customer waste container from the customer location.

4. The system of claim 1, wherein the action further comprises a customer billing adjustment.

5. The system of claim 1, wherein the customer communication comprises an educational message to the customer regarding container overages.

6. The method of claim 2, wherein the action further comprises a container recovery instruction for the customer waste container for delivery to the waste collection vehicle to collect the customer waste container and remove the customer waste container from the customer location.

7. The method of claim 2, wherein the action further comprises a customer billing adjustment.

8. The method of claim 2, wherein the customer communication comprises an educational message to the customer regarding container overages.

9. The method of claim 2, wherein the predetermined overload threshold condition is specific to the customer at the customer site.

10. The method of claim 2, further comprising soliciting a confirmation from a driver of the waste collection vehicle via visual inspection that the fill status has met or surpassed the predetermined overload threshold condition.

11. The system of claim 1, wherein the action further comprises a container recovery instruction for delivery to the waste collection vehicle to remove the customer waste container from the customer location and replace the customer waste container with a new container.

12. The system of claim 1, wherein the action further comprises a container recovery instruction for delivery to the waste collection vehicle to remove the customer waste container from the customer location and replace the customer waste container with a new container.

13. The system of claim 1, wherein the action further comprises a container recovery instruction for delivery to the waste collection vehicle to provide an additional container at the customer location.

14. The system of claim 1, wherein the action further comprises a container recovery instruction for delivery to the waste collection vehicle to provide an additional container at the customer location.

15. The system of claim 1, wherein the customer scoring is impacted by acceptances of similar action proposals by other customers of the waste services provider.

16. The method of claim 2, wherein the customer scoring is impacted by acceptances of similar action proposals by other customers of the waste services provider.

17. The system of claim 1, wherein the processor is further configured to identify that the container lid is open due to overloading of the container, and wherein the customer communication comprises (i) a video or still image to demonstrate to the customer that the container lid is open, and (ii) a request to the customer to close the container lid.

18. The method of claim 2, wherein the processor is further configured to identify that the container lid is open due to overloading of the container, and wherein the customer communication comprises (i) a video or still image to demonstrate to the customer that the container lid is open, and (ii) a request to the customer to close the container lid.

19. The system of claim 1, wherein the predetermined overload threshold condition is specific to the particular customer receiving the customer communication.

20. The system of claim 1, wherein the predetermined overload threshold condition is specific to the particular customer receiving the customer communication.

21. The system of claim 1, wherein the image data is displayed on a graphical user interface for viewing by a user, and wherein the determination of whether the fill status of the customer waste container has met or exceeded the predetermined overload threshold condition is made by both the user and the processor.

22. The system of claim 21, wherein the determination of whether the fill status of the customer waste container has met or exceeded the predetermined overload threshold condition is made by the user, the processor and by a driver of the waste collection vehicle.

23. The method of claim 22, wherein the determination made by the driver of the waste collection vehicle is subsequent to the determination made by the user and the processor.

24. The method of claim 2, wherein the image data is displayed on a graphical user interface for viewing by a user, and wherein the determination of whether the fill status of the customer waste container has met or exceeded the predetermined overload threshold condition is made by both the user and the processor.

25. The method of claim 24, wherein the determination of whether the fill status of the customer waste container has met or exceeded the predetermined overload threshold condition is made by the user, the processor and by a driver of the waste collection vehicle.

26. The method of claim 25, wherein the determination made by the driver of the waste collection vehicle is subsequent to the determination made by the user and the processor.

* * * * *